(12) United States Patent  
Schneider

(10) Patent No.: US 7,763,310 B2  
(45) Date of Patent: Jul. 27, 2010

(54) METHOD AND APPARATUS FOR THIN FILM/LAYER FABRICATION AND DEPOSITION

(75) Inventor: Juan Schneider, Laval (CA)

(73) Assignee: Nanometrix Inc., Montreal (CA)

( * ) Notice: Subject to any disclaimer, the term of this patent is extended or adjusted under 35 U.S.C. 154(b) by 0 days.

(21) Appl. No.: 12/352,150

(22) Filed: Jan. 12, 2009

(65) Prior Publication Data

US 2009/0181162 A1   Jul. 16, 2009

Related U.S. Application Data

(63) Continuation of application No. PCT/CA2007/001232, filed on Jul. 12, 2007.

(60) Provisional application No. 60/830,102, filed on Jul. 12, 2006.

(51) Int. Cl.  
*B05D 5/00* (2006.01)

(52) U.S. Cl. .......................................... 427/9; 427/10

(58) Field of Classification Search ....................... None  
See application file for complete search history.

(56) References Cited

U.S. PATENT DOCUMENTS

| | | | |
|---|---|---|---|
| 3,975,225 A * | 8/1976 | Bottenbruch et al. ........ | 156/242 |
| 4,406,673 A | 9/1983 | Yamada et al. | |
| 4,814,132 A | 3/1989 | Aoki et al. | |
| 5,512,326 A * | 4/1996 | Albrecht et al. .......... | 427/430.1 |
| 6,284,310 B2 * | 9/2001 | Picard ........................ | 427/180 |
| 2005/0129867 A1 * | 6/2005 | Picard et al. ............. | 427/434.3 |

FOREIGN PATENT DOCUMENTS

GB    1 431 965    4/1976

\* cited by examiner

*Primary Examiner*—Erma Cameron  
(74) *Attorney, Agent, or Firm*—Ogilvy Renault LLP

(57) ABSTRACT

A method and apparatus for controlling the thickness of a thin film or thin layer of discrete particles or of a heterogeneous mixture characterized in that the interfacial tension forces between the solution or suspension and its environment are used as the driving forces to evenly spread the solution, suspension or mixture while the solvent evaporates and/or dilutes.

10 Claims, 3 Drawing Sheets

METHOD AND APPARATUS FOR THIN FILM/LAYER FABRICATION AND DEPOSITION

RELATED APPLICATION(S)

This application is a continuation of PCT parent Application No. PCT/CA2007/001232 filed on Jul. 12, 2007, which claims benefit of U.S. Patent Application No. 60/830,102 filed on Jul. 12, 2006, which are herein incorporated by reference.

FIELD OF THE INVENTION

The present invention relates to a method and an apparatus for the fabrication of thin films or thin layers. The method is particularly suited for thin polymer films fabrication and coating.

DESCRIPTION OF THE PRIOR ART

Applicant's co-pending application Ser. No. 10/981,485 filed Nov. 5, 2004 discloses a method and an apparatus suited for making thin films of polymers or monolayers of various thicknesses. For instance, 1 nanometer to 100 nanometers thick monolayers and films have been made using that method.

However, there is an important demand in the industry for polymer films having a thickness in the order of about 100 nanometers to about 100 micrometers. One could resort to the method described in the above mentioned patent application in order to fabricate such polymer films, but it would necessitate the deposition of several monolayers one on top of the other before obtaining the desired thickness. The formation of such multilayer films is not as efficient as the formation of a single layer having the desired thickness. It limits the productivity and results in higher manufacturing costs.

Moreover, thin films and specialized coatings made of mixtures of heterogeneous materials such as polymers, solvents and colloids all together are increasingly in demand for various applications in the energy industry, Micro-Electro-Mechanical System (MEMS) and complex surface treatments.

There is thus a continued need to provide improved thin film/layer fabrication methods and systems.

SUMMARY OF THE INVENTION

It is therefore an aim of the present invention to provide a new apparatus for fabricating thin films or layers in an efficient and economical way.

It is also an aim of the present invention to provide a novel method for fabricating thin films or layers in an efficient and economical way.

Therefore, in accordance with a general aspect of the present invention, there is provided a method for forming a thin film or a thin layer of discrete particles, the method comprising: providing a film forming substance in the form of a solution, a suspension or an heterogeneous mixture of molecules and particles on a fluid carrier, and controlling the interfacial tensions between the film forming substance, the fluid carrier and the surrounding atmosphere in accordance with a desired film or layer thickness.

In accordance with a further general aspect, there is provided a method of producing a three dimensional assembly of particles, comprising: injecting feedstock, including particles in a solvent, at a gas-liquid interface between a carrier liquid and a gas contained in an enclosure, controlling the interfacial tensions between the feedstock, the gas and the carrier liquid while the solvent dissipates from the feedstock; at the time of injection, the solvent making the surface tension F3 between the gas and carrier liquid greater than the sum of the surface tension F1 between the gas and the feedstock and the surface tension F2 between the liquid carrier and the feedstock, thereby causing the feedstock to spread out at the surface of the carrier liquid, and once an equilibrium point is substantially reached removing the three dimensional assembly of particles from the enclosure.

The term "thin layer" is herein intended to mean: packing of discrete units in a preferred surface.

The term "thin film" is herein intended to mean: packing of intermingled molecules and large molecules in a preferred surface.

It is also understood that the produced thin layer or the thin film could be used as a coating on a given substrate.

Heterogeneous mixture is herein intended to generally refer to a mixture of heterogeneous materials, including molecules and/or particles.

BRIEF DESCRIPTION OF THE DRAWINGS

Reference will now be made to the accompanying drawings, showing by way of illustration a preferred embodiment thereof, and in which.

DESCRIPTION OF THE PREFERRED EMBODIMENTS

Figure 1:
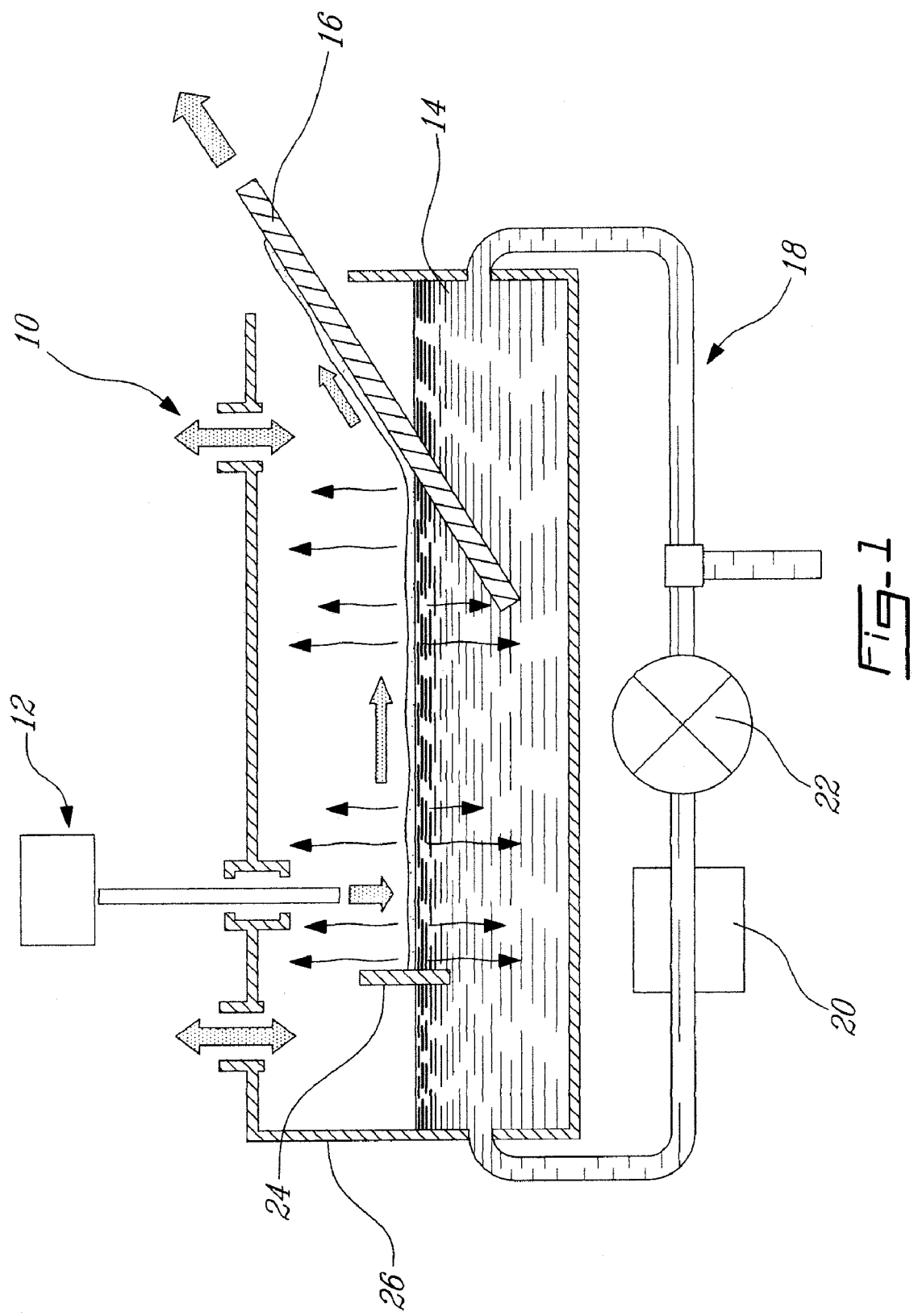
FIG. 1 is a schematic side view of an apparatus suited for the fabrication of thin polymer films or layers having a thickness in the order of 100 nanometers to 100 micrometers.
Figure 2:
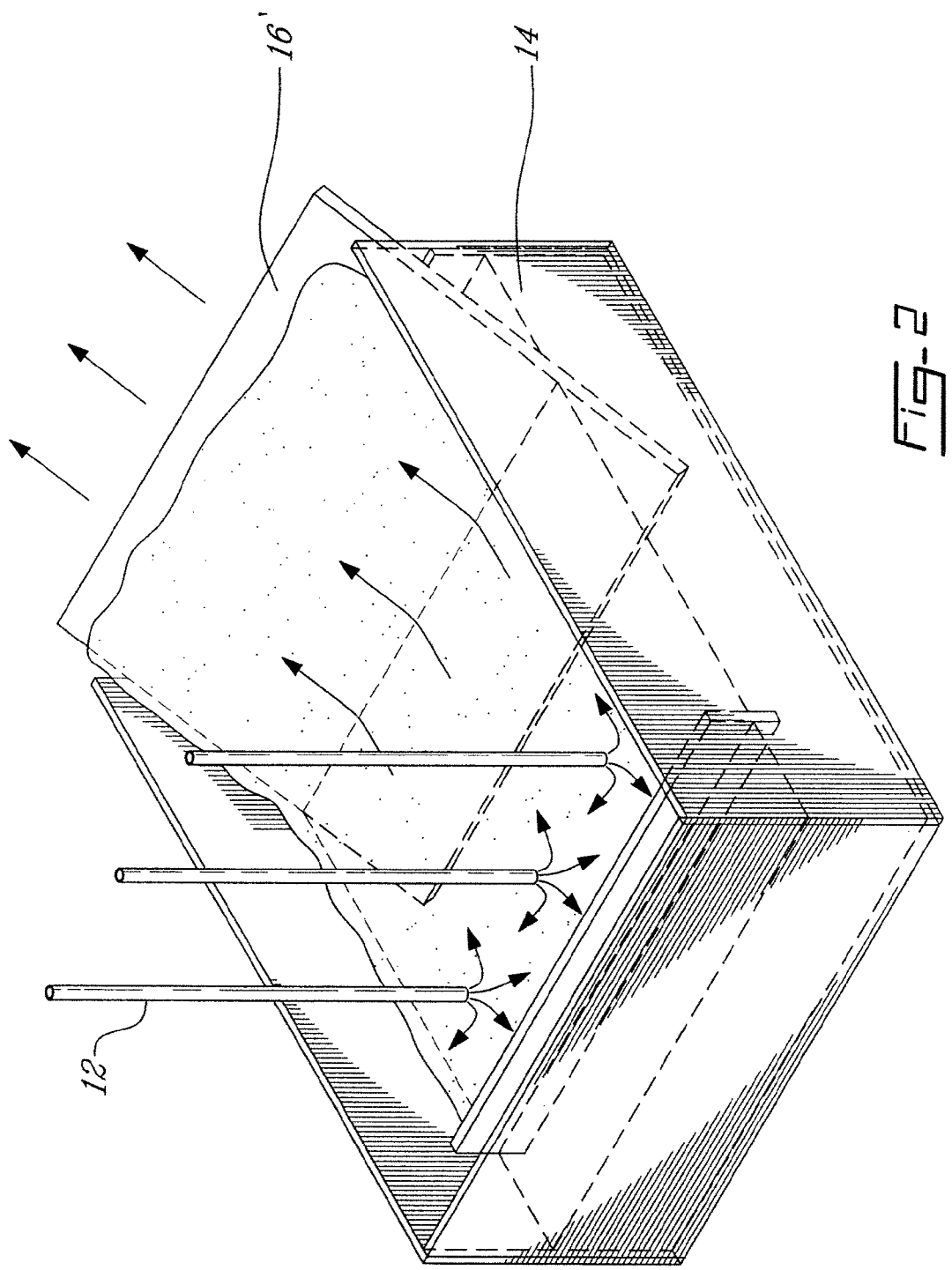
FIG. 2 is a schematic perspective view of the apparatus shown in FIG. 1.

FIG. 1 shows an apparatus 10 suited for producing three dimensional assembly of particles, such as thin films or thin layers having a thickness scaling from about 100 nanometers to about 100 micrometers. The apparatus 10 generally comprises an injection unit 12, a bath 14 for thin film/layer formation and a transferring unit 16 for withdrawing the film/layer from the bath 14. A re-circulation system 18, including a filtration, or treatment unit 20 and a pump 22 can be coupled to the bath 14.

The injection unit 12 injects a film forming substance or feedstock in the form of a solution (e.g. polymers in a solvent), a suspension (e.g. $SiO_2$ particles in a solvent) or heterogeneous mixture at a gas-liquid interface of a carrier fluid (e.g. water) contained in bath 14. The injection point should be as close as possible to the gas-liquid interface but not under the level of liquid. A solution is used when it is desired to form a film, whereas a suspension is used when it is desired to obtain a monolayer or multilayer. A heterogeneous mixture of particles and molecules can also be injected at the liquid-gas interface to obtain the desired film or layer. Various solvents can be used in the solutions, the suspensions and the heterogeneous mixture. For instance, the solvent could consist of: all kinds of alcohols or organic solvent; ethanol, methanol, Butanaol, PGMEA, and chloroform. This is not intended to constitute an exhaustive list. The carrier fluid can for instance consist of any liquid having a greater surface tension than that of the solvent contained in the solution or the suspension deposited on the carrier fluid. For instance, the carrier fluid could consist of all kinds of water solutions or mercury. This is also not intended to constitute an exhaustive list.

Figure 3:
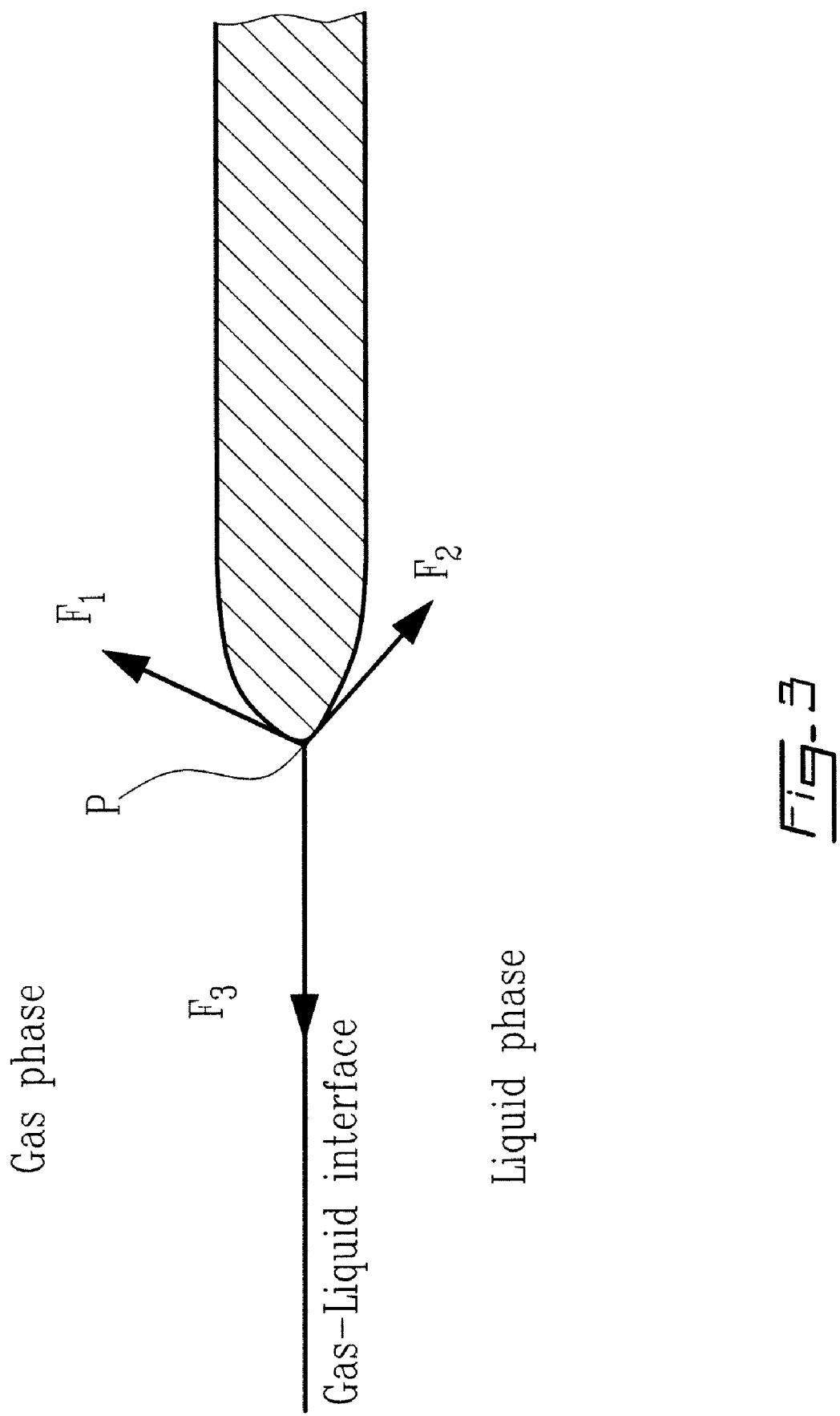
FIG. 3 is schematic view illustrating the interfacial tension forces between a droplet of solution, suspension or heterogeneous mixture, with a fluid carrier and the surroundings.

Interfacial forces pull the dispensed solution, suspension or slurry to spread out, covering the entire region of the carrier fluid that is exposed to the gas phase. More particularly, as shown in FIG. 3, the resultant interfacial surface tension S (S the spreading parameter) being the resultant vector of all surface tension vectors at the triple contact point P. $F_1$ is the surface tension between the gas phase and the solution/suspension, $F_2$ the surface tension between the solution/suspension and the carrier fluid (water in the illustrated example), and $F_3$ the surface tension between the gas phase and the carrier fluid. At the moment of the injection, the presence of solvent makes F1 and F2 to decrease, making F3 greater than the sum of the 2 others, driving the solution or suspension to expand so as to cover the maximum surface possible. The spreading dynamics is well described by the vector equation (1):

$$S=F_3-(F_1+F_2) \quad (1)$$

If $[S]_x>0$, solution/suspension will spread out over the entire free surface of the carrier liquid until $[S]_x$ reaches 0 or becomes negative due to solvent evaporation/miscibility affecting the concentration and viscosity of the material cast during the spreading. ($[S]_x$=scalar of S in the direction of the x axis, parallel to the horizontal gas-liquid interface)

Over time, the solvent dissipates which cause F1 and F2 to increase. As a consequence, the illustrated droplet will reach an equilibrium point, stopping the spreading phenomena. By controlling the interaction between these interfacial tensions, it is thus possible to control the thickness of the film. While the polymer thins down due to solvent evaporation or immersion (dilution of the solvent in the liquid), the quasi gel-solidified polymer film is transferred at a predetermined rate to a substrate forming part or carried by the transferring unit 16.

The thickness of the thin film or layer is generally governed by 1) the concentration (the relative content of solvent and polymer in the injected solution), 2) the rate of injection of the solution at the surface of the carrying liquid, 3) the dynamics of evaporation and/or dilution (miscibility) of the solvent in the carrying liquid, 4) composition of the gas phase and solvent content and saturation, 5) the retrieval speed of the transferring unit 16, 6) solvent content in the carrying liquid, and 7) temperature of the carrying liquid and the gas phase. Equilibrium is maintained constant to keep the film thickness constant during the formation of a given film or layer. Conditions could be alternated in order to have a repeated variation of thickness where continuous and/or piece by piece coatings are needed. Thickness variations from one film/layer to another can be obtained by modifying mainly, but not only, the injection and retrieval rates.

For instance, if a chamber is provided as shown in FIG. 1, solvent presence in the gas phase will affect the speed of evaporation. At saturation, gas transfer rates from in to out the film forming substance are balanced keeping the presence of the solvent constant in the substance matrix, in thermodynamic equilibrium. Accordingly, solvent content and saturation in the gas phase can be used to control the thickness of the film/layer.

By controlling the evaporation and/or miscibility of solvent in the carrier fluid contained in the bath 14 (that is the formation rate of the film at the surface of the fluid in the bath) in relation to the speed at which the film is retrieved from the bath 14 and the distance between the injection site and the film withdrawal site, it is also possible to deposit a film or a layer of a predetermined thickness on a given substrate. The evaporation rate can be varied by controlling the environmental temperature of the bath 14 (or as explained before, the presence of the solvent in the gas phase). This could be easily achieved by enclosing the bath 14 in an environmentally controlled chamber, as shown in FIG. 1. The temperature in the chamber could be adjusted through the use of a heating/cooling system coupled to appropriately disposed temperature sensors. Keeping the gas phase at a certain temperature could be useful for controlling thermodynamics of solvent rates exchange. Moreover, cooling or heating the solution before injection, can be used to perform spreading in a more violent or gentler way and therefore control the desired thickness and quality of the films. Also, transversal internal partitions (not shown) could depend from an inner surface of the top wall of the environmentally controlled chamber down to a short distance from the top surface of the body of carrier liquid to compartment the interior volume of the chamber, thereby slowing down the evaporation of the solvent out of the chamber through an opening defined therein and globally ensuring a more uniform solvent evaporation over the entire surface of the film being formed. This would provide for a more homogenous film. Also, as shown in FIG. 1, a deflector 24 could transversally span the interior of the chamber at a location downstream of the injector 12 to provide a free access zone 26 to the carrier liquid. The deflector 24 prevents the film from spreading over and covering the free access zone 26, thereby guarantying direct access to the bath 14 at any time during the film formation process. This might be useful whenever there is a need to inject an additive into the carrier fluid or measure some parameters thereof. For instance, one could inject the same solvent as the solvent contained in the film forming substance provided at the gas-liquid interface in order to change the miscibility of the solvent in the carrier liquid. The deflector 24 can be linear to act as a simple barrier at the surface of the carrier fluid or, alternatively, the deflector could have a parabolic or curved configuration to direct the propagation of the film or layer being formed in a desired direction towards the transfer unit 16.

By varying the injection rate of the solution for one predetermined concentration of solution, while maintaining the other above mentioned parameters constant, various film thicknesses can be obtained.

The choice of the solvent in the solution, suspension or mixture versus the carrier fluid will also affect the thickness of the film. Indeed, the miscibility of the solvent in the carrier fluid affects the dilution rate of the solvent and, thus, changes the formation rate of the film.

In order to increase the thickness of the polymer film, one could increase the concentration of the polymer, particles or fibers in the solution, suspension or mixture. This implies that less solvent will need to evaporate for the particles or fibers to become assembled to one another in a thin film configuration at the surface of the carrier fluid. Therefore, the solidification process of the film will occur more rapidly (meaning less time to spread out). The spreading of the solution on the carrier fluid stops when there is no more solvent in the solution leaving the solids behind. Thus for a given concentration, the higher the solvent evaporation, the thicker is the film.

The transferring unit 16 could for instance be provided in the form of a conveyor, a web or any other suitable flexible or rigid substrate. The film formed on the carrier fluid could be directly deposited on parts carried by the conveyor. In FIG. 2, the transferring unit 16' is provided in the form of a rigid planar substrate to be coated with a thin polymer film.

The apparatus 10 preferably comprised a monitoring system to obtain on-line feedback on the thickness of the film being made. The monitoring system can comprise a source of light adapted to direct a beam of light through the chamber in which the film is being made. The film-gas interface and the film-liquid interface provide two light reflective surfaces that will reflect light and produce interferential light pattern on the film being formed. The interferential light pattern takes the form of light strips of different colours on the film, each strip corresponding to a thickness variation in the film being formed. The larger the strips, the more uniform the thickness of the film is. A single light strip covering the entire surface of the film corresponds to a film having a uniform thickness over the full extent thereof. Therefore, by monitoring the reflected light pattern, the surface tension parameters can be dynamically adjusted by changing the thermodynamical and physicochemical conditions in the chamber in order to obtain a single light strip and, thus, a film having a uniform thickness.

According to some applications, including coating, the transfer unit 16 could be omitted and the chamber could be closed and open only once the film is fully formed at the surface of the carrier fluid.

It is understood that the present invention is not limited to thin polymer film fabrication, but could be applied to other types of film as well (polymers, thermoplastics, engineering plastics (nylons), resins and thermosets, rubbers (elastomers), paints, sealants and adhesives, composites, natural giant molecules (lignins, bitumens, etc.), amino acids, nucleic acids, DNA, photoresists, polymeric foams, polymeric cement, etc.). The term "particle" is herein used to broadly refer to a molecule, a colloid, a nano or micro cluster, polymer or oxide beads, proteins, nano diamonds, carbon nano tubes or fibers or a combination of some or all of them, to name a few.

What is claimed is:

1. A method for forming a thin film or a thin layer of discrete particles having a thickness less than about 100 micrometers, the method comprising: providing a film forming substance on a carrier fluid contained in an enclosure defining an environmentally controlled chamber, the film forming substance including a solvent and being selected from a group consisting of: a solution, a suspension or an heterogeneous mixture, the carrier fluid having a greater surface tension than that of the solvent contained in the film forming substance; and dynamically controlling the interfacial tensions between the film forming substance, the carrier fluid and a surrounding atmosphere inside the environmentally controlled chamber in accordance with a target film or layer thickness, wherein controlling the interfacial tensions includes acting on the thermodynamical and physicochemical conditions inside the environmentally controlled chamber at the interface between the film forming substance, the carrier fluid and the surrounding atmosphere, and wherein acting on the thermodynamical and physicochemical conditions includes controlling the temperature of the carrier fluid and the concentration of solvent in the surrounding atmosphere within the environmentally controlled chamber.

2. The method defined in claim 1, wherein the film forming substance also comprises particles, and wherein acting on the thermodynamical and physicochemical conditions further includes controlling the following parameters: the relative concentration of particles and solvent in the film forming substance, a rate of injection of the film forming substance on the carrier fluid, a rate of evaporation of the solvent from the film forming substance and/or a rate of dilution of the solvent in the fluid carrier, and the retrieval speed of the film from the carrier fluid.

3. The method defined in claim 1, wherein providing a film forming substance on a carrier fluid comprises injecting the film forming substance at an interface between the carrier fluid and the surrounding atmosphere.

4. The method defined in claim 1, wherein the carrier fluid and the surrounding atmosphere define a liquid-gas interface, and wherein providing a film forming substance on said carrier fluid comprises injecting the film forming substance at said liquid-gas interface.

5. The method defined in claim 1, wherein the film forming substance and the surrounding atmosphere have a first interface, the film forming substance and the carrier fluid having a second interface, the first and second interface providing first and second reflective surfaces, and wherein the method further comprises monitoring the thickness of the film or layer being formed by analysing the interferential light pattern reflected by said first and second reflective surfaces.

6. The method defined in claim 1, wherein the film forming substance comprises a solvent and particles, the surrounding atmosphere being a gaseous environment having a gas phase, and wherein controlling the interfacial tensions includes using solvent content and saturation in the gas phase to control solvent evaporation from the film forming substance.

7. The method defined in claim 6, further comprising controlling the miscibility of the solvent contained in the film forming substance in the carrier fluid.

8. The method defined in claim 7, comprising adjusting the solvent evaporation and miscibility in relation of the rate at which the film or layer is retrieved.

9. A method of producing a three dimensional assembly of particles, comprising: injecting feedstock, including particles in a solvent, at a gas-liquid interface between a carrier liquid and a gas contained in an enclosure, the carrier liquid having a greater surface tension than that of the solvent contained in the feedstock, controlling the interfacial tensions between the feedstock, the gas and the carrier liquid while the solvent dissipates from the feedstock; at the time of injection, the solvent making the surface tension F3 between the gas and carrier liquid greater than the sum of the surface tension F1 between the gas and the feedstock and the surface tension F2 between the liquid carrier and the feedstock, thereby causing the feedstock to spread out at the surface of the carrier liquid, and once an equilibrium point is substantially reached removing the three dimensional assembly of particles from the enclosure, wherein the enclosure is an environmentally controlled chamber, and wherein controlling the interfacial tensions includes using solvent content and saturation in the gas contained in the environmentally controlled chamber to control solvent evaporation from the film forming surface.

10. The method defined in claim 9, comprising controlling the dissipation rate of the solvent in the gas and the carrier liquid.

* * * * *